United States Patent [19]

Wurm et al.

[11] Patent Number: 5,255,205
[45] Date of Patent: Oct. 19, 1993

[54] METHOD AND APPARATUS FOR REGULATING FLUID FLOW

[75] Inventors: Christopher M. Wurm; Lenore R. Frank, both of Landenberg, Pa.; Lee H. Altmayer, Hockessin, Del.

[73] Assignee: Hewlett-Packard Company, Palo Alto, Calif.

[21] Appl. No.: 487,658

[22] Filed: Mar. 2, 1990

[51] Int. Cl.$^5$ .................................................. G06F 15/20
[52] U.S. Cl. ..................................... 364/510; 138/39; 138/40
[58] Field of Search ............. 364/509, 510, 560, 564, 364/558; 418/150, 195; 138/37, 39, 40; 137/2, 13, 455; 222/14, 52, 71

[56] References Cited

U.S. PATENT DOCUMENTS

| | | | |
|---|---|---|---|
| 3,632,239 | 1/1972 | Zimmern | 418/150 |
| 3,875,955 | 4/1975 | Gallatin et al. | 364/510 |
| 3,905,731 | 9/1975 | Zimmern | 418/195 |
| 4,075,930 | 2/1978 | Millet | 418/150 |
| 4,331,262 | 5/1982 | Snyder et al. | 222/14 |
| 4,487,333 | 12/1984 | Pounder et al. | 364/509 |
| 4,797,834 | 1/1989 | Honganen et al. | 137/2 |

FOREIGN PATENT DOCUMENTS

| | | | |
|---|---|---|---|
| 0453676 | 1/1975 | U.S.S.R. | 222/14 |
| 0472258 | 9/1975 | U.S.S.R. | 222/14 |

Primary Examiner—Jack B. Harvey
Assistant Examiner—Ellis B. Ramirez
Attorney, Agent, or Firm—Richard F. Schuette

[57] ABSTRACT

Method and apparatus for regulating the passage of fluid through a chamber or other type of conduit. Fluid passage is terminated when the volume of fluid which has swept through a chamber equals a selected multiple of the chamber's internal volume, which multiple is known as swept chamber volumes.

21 Claims, 2 Drawing Sheets

METHOD AND APPARATUS FOR REGULATING FLUID FLOW

BACKGROUND OF THE INVENTION

This invention relates to a method and apparatus for regulating the passage of fluids through chambers and other conduits. More specifically, this invention relates to a method and apparatus which accomplish such regulation by exploiting the relationship between the volume of the chamber and the volume of the fluid passed.

It will be appreciated by those skilled in the art that a fluid is a substance which alters its shape in response to applied force and which tends to flow or to conform to the outline of its container. Fluids include gases, liquids, supercritical fluids, plastic solids, and mixtures of solids and liquids capable of flow.

The passage of fluids through conduits provides the basis for numerous techniques in such fields as manufacturing, medicine, and scientific research. Conduits through which fluids pass may possess various shapes and dimensions. One shared characteristic of such conduits is the capacity to substantially contain and direct the flow of a fluid passed therethrough. It will be understood that a portion of a conduit having ascertainable dimensions may be known as a chamber or, alternatively, as a thimble or container.

One set of techniques involving the passage of fluids is the extraction of chemical compounds contained in matrices of solid support material. In many chemical extractions, a fluid which will dissolve a chemical compound of int(R)r (R)st is passed through a chamber or a portion thereof containing the matrix. A fluid employed in this manner is known in the art as an extraction fluid or extraction solvent; the dissolved species contained in an extraction solvent which has passed over the matrix is known as a solute. In most extractions, the fluid which has passed over the matrix is collected and the solute is isolated therefrom by various well-known techniques.

It is known, for example, to use supercritical and near-critical fluids in chemical extractions. As will be appreciated by those skilled in the art, slight changes in temperature and pressure in what is known as a fluid's critical region cause extremely large changes in the density of the fluid, and thus in its dissolving power. The supercritical region comprises all temperatures and pressures above which the distinction between liquids and gasses disappears. Supercritical fluids are thus a useful hybrid of gases and liquids which possess gas-like viscosities, liquid-like densities, and diffusivities greater than typical liquid solvents, commonly approaching values intermediate between those of typical gases and liquids. Compared to typical liquid solvents, the supercritical fluid properties of viscosity and diffusivity allow enhanced mass transport within complex matrices such as coal, plant or animal tissue, or packed beds.

Under conditions where the pressure exerted upon the fluid is less than the critical point pressure and the temperature is such that the actual pressure of the fluid is greater than about seven tenths of the critical pressure (i.e., at reduced pressures greater than about 0.6) and the density is greater than about two tenths of the critical density (i.e., at reduced densities greater than about 0.2), the resulting gas is dense enough to provide enhanced solvation and vaporization of solutes into th gas. Compressible liquids near the critical point have liquid-like densities and diffusivities and viscosities similar to supercritical fluids. Thus, due to enhanced mass transport properties, such compressible liquids are more attractive as solvents than typical, virtually-incompressible liquids.

Accordingly it is often desired in extractions and other applications that the passage of a fluid be carefully controlled or regulated. It will be appreciated by those skilled in the art that there exist myriad methods for effecting such control. It is quite common, for example, to terminate the passage of a fluid after a pre-determined mass of the fluid has been passed over a matrix bearing a chemical compound. It is also known to terminate such passage after a pre-determined volume of an incompressible fluid has been passed. In another method, the quantity of extracted solute is monitored and the passage of the fluid is terminated after a certain amount of that solute is obtained.

Unfortunately, however, many such methods for regulating the passage of fluids have significant disadvantages. For example, continued monitoring of the amount of solute extracted can be burdensome. Also, the amount of solute extracted from a matrix may not necessarily correspond to the mass or volume of extraction solvent employed. This is particularly true where mass or volume are measured by reference to mass or volumetric flow rates determined in a pumping region which is held at constant or controlled conditions different from the variable conditions of a chamber downstream from the pumping region. Thus, regulation of fluid passage in such extractions by reference solely to the mass flow or pump volumes of solvent employed will frequently be inefficient, largely failing to take into account that the residence time within the chamber varies according to the pressure and temperature settings of the chamber. This is true even where the mass flow rate of the system or the volume flow rate at the pump remain constant. Frequently, neither the extent of contact of the material with fresh extracting fluid nor possible mechanisms by which solvents diffuse through matrices comprising extractable material are properly taken into account.

Thus, it would be of great advantage to regulate the passage of fluids in chemical extractions and other applications by techniques more efficient and less labor-intensive than those presently known in the art, perhaps by techniques which account for the relationship between either the size of the extraction sample or the volume of the chamber and the volume of extraction fluid employed.

SUMMARY OF THE INVENTION

It is one object of the present invention to provide a method and apparatus for effectively regulating the passage of fluids through chambers and other conduits.

It is another object of the present invention to provide a method and apparatus for efficiently regulating such fluid passage.

It is yet another object of the present invention to provide an at least partially automated method and apparatus for regulating such fluid passage.

It is a further object of the present invention to provide a method and apparatus for regulating the passage of extraction fluids through chambers which in some manner relate the volume of fluid employed to either the volume of the chamber or the size of the extraction sample contained therein.

These and other objects are accomplished by the method and apparatus of the present invention, which terminate the passage of fluid through a chamber when the volume of fluid which has passed equals a selected multiple of the chamber's internal volume, which multiple is known as swept chamber volumes.

In a preferred embodiment, the method comprises passing a fluid through a chamber containing a matrix to be extracted an providing to processing means a data set comprising the flow rate of the fluid, the time interval over which the liquid is passed, and the internal volume of the chamber. A swept chamber volume value is then provided by applying, via the processing means, a swept chamber volume function to the data set. The passage of the fluid is then terminated by reference to the swept chamber volume value.

DESCRIPTION OF PREFERRED EMBODIMENTS

Figure 1:
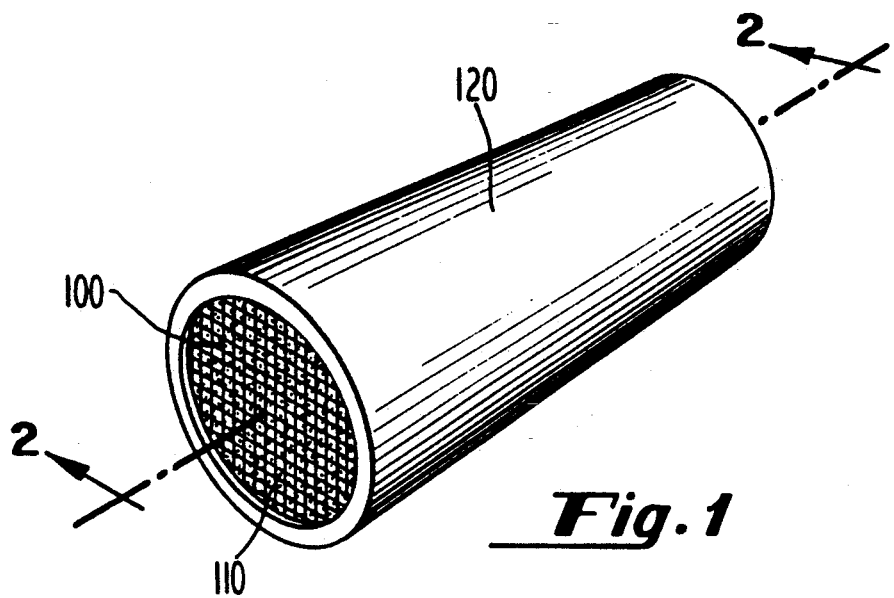
FIG. 1 perspective view of a cylindrical chamber comprising porous end members and a matrix to be extracted contained therebetween.
Figure 2:
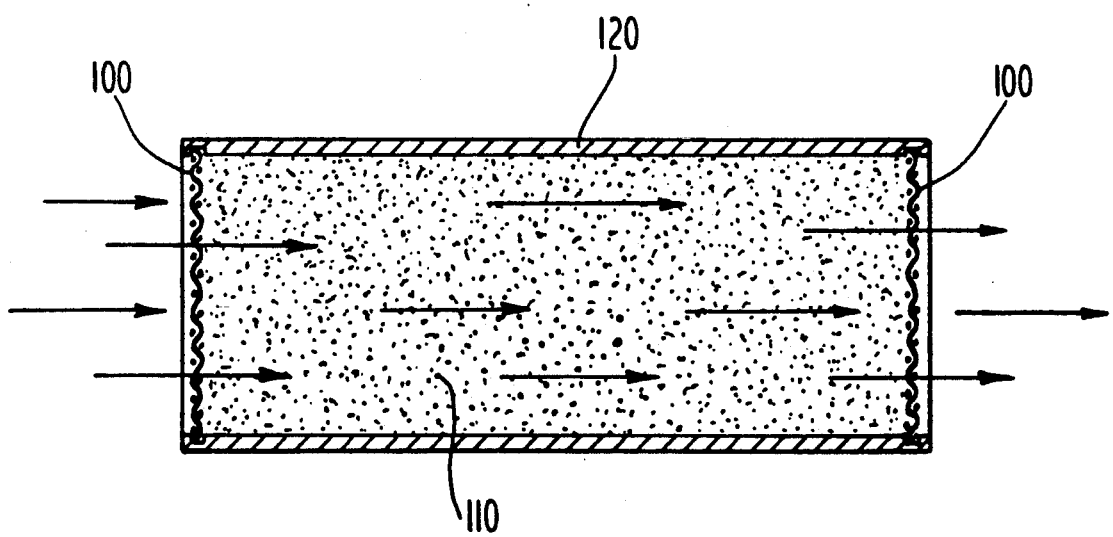
FIG. 2 is cross-section view of a cylindrical chamber comprising porous end members and a matrix to be extracted contained therebetween, as indicated by the lines and arrows in FIG. 1.

In accordance with the present invention, a fluid is passed through a conduit such as the chamber (120) having porous end members (100) as depicted in FIGS. 1 and 2. Virtually any fluid is amenable to the practice of this invention and may comprise a wide variety of chemical compounds well known in the art, such as water, carbon dioxide, organic solvents, and mixtures thereof. It is preferred that the fluid be compressible and comprise carbon dioxide. It is also preferred that sections of the flow path can be variably set at different volume and temperature conditions, while the system downstream of the pumping section is maintained at a pressure setpoint. Density then is a dependent variable of the volume, temperature and pressure. It is particularly preferred that the solvent delivery system, also known as the pumping section or region, be set at conditions—except pressure—different from those in other sections. It will be appreciated that the pumping section supplies system pressure.

In accordance with the present invention, a data set is provided to processing means. In certain, preferred embodiments, this data set comprises parameter information relating to the conditions under which fluids are passed through chambers such as shown in FIGS. 1 and 2. It is preferred that parameter information comprise the flow rate of the fluid as it passes through the conduit, the internal volume of the conduit, and the time interval over which fluid is passed.

After the data set is provided to the processing means, the number of swept chamber volumes is provided by applying a swept chamber volume function to the data set according to:

$$SCV = V_f/V_i \quad (1)$$

where SCV is swept chamber volumes, $V_f$ is the volume of fluid which has passed through the chamber over a known time interval, and $V_i$ is the internal volume of the chamber, preferably its void volume when filled with some matrix. It will be appreciated by those skilled in the art that a number of embodiments exist for the swept chamber volume function of equation (1). For example, $V_f$ may be known or may be calculated by methods well-known by those skilled in the art from other parameters, such as the mass or density of the particular fluid employed. It is preferred that the swept chamber volume function be applied via the processing means according to:

$$SCV = (T \cdot F_{sys})/V_i \quad (2)$$

where T is time interval over which the fluid is passed and $F_{sys}$ is the fluid's flow rate through the chamber, expressed as volume per unit time. As will be appreciated by those skilled in the art, where it is possible to vary the density of a fluid is as it passes through a chamber, it may prove necessary to correct $F_{sys}$ to account for such variance. Thus, where a fluid is supplied at a constant, controlled, or known density, from a source such as pumping region at constant temperature and pressure to deliver a fluid having known density, it is preferred that $F_{con}$—the fluid's flow rate at the density in the pumping region or source—be used in calculating swept chamber volumes. Thus, $F_{con}$ is multiplied by the density ratio for the fluid, that is, the ratio of the constant source density to the density in the chamber. Where such correction is made, it is preferred that the swept chamber volume function be applied according to:

$$SCV = \{T \cdot [F_{con} \cdot (D_{con}/D_{sys})]\}/V_i \quad (3)$$

where $D_{con}$ is the constant density at the source and $D_{sys}$ is the density in the chamber.

Once a selected value for swept chamber volumes is reached, the passage of the fluid through the conduit is terminated. In certain embodiments, suitable values for swept chamber volumes are empirically derived for a given application on the basis of such criteria as the particular fluid employed and the nature of any extraction matrix contained in the chamber. The nature of an extraction matrix encompasses properties such as porosity.

Fluids may exist as various physical phases, such as liquids, gases, supercritical fluids, and certain solids. As will be appreciated by those skilled in the art, the physical phase of a fluid will be highly dependent upon the ambient conditions under which it is held. It is preferred that a fluid comprise a single physical phase as it passes through a chamber.

While it is preferred that the fluid be passed under supercritical conditions and near-critical conditions, fluids according to the present invention can exist under virtually any set of ambient conditions, such as temperature and pressure. Likewise, fluids may be passed through conduits at a wide variety of flow rates and densities. The temperature, pressure, flow rate, and density of fluids may be controlled by any of the various techniques well-known to those skilled in the art.

Virtually any conduit is amenable to the practice of the present invention, so long as it has ascertainable internal volume. Pipes, tubes, and chambers provide examples of useful conduits. It is preferred that the conduit be a chamber with end members permeable to fluids but capable of containing granular and/or porous solid matter such as support media, soils, sludges, animal tissue, plant material, plastics, and powders, as well as liquids, fats, waxes, and semi-solids distributed, for example, on support media.

Thus, conduits may optionally comprise structural elements other than those necessary for the containment and direction of fluids. For example, a matrix comprising a solid support and one or more chemical compounds of interest may be contained between the end members of a conduit in accordance with this invention. Such matrices are well known by those skilled in the chromatographic arts to have numerous embodiments. Chemical compounds such as pharmaceuticals, herbicides, or food additives adsorbed on solid supports such as celite, silica gel, or microcrystalline cellulose provide examples of suitable matrices, as do solid samples which need no solid support, such as soil and plant material.

It will be appreciated by those skilled in the art that any element contained within a conduit, such as a matrix bearing a chemical compound, decreases the actual free volume within a conduit through which a fluid might pass. Thus, it will be understood that more accurate regulation of fluid passage will be obtained where the void volume of the conduit is employed as its internal volume, such as by subtracting the volume of a contained matrix from the internal volume calculated by appropriate multiplication of the internal dimensions of the conduit. The volume of a contained matrix may, of course, be precisely determined by well-known means. It will be appreciated, however, that even a reasonable accurate estimate of matrix volume and, hence, void volume, will result in more accurate regulation of fluid passage than were no such allowance is made for the volume occupied by a contained matrix. Thus, where is estimated that a contained matrix occupies half of the internal volume of a cylindrical chamber having a radius of 5 mm and a length of 25 mm, the chamber's estimated void volume will be 1 ml.

Processing means which can be employed in the practice of this invention consist of any computing device capable of compiling and executing instructions, preferably the Hewlett-Packard Vectra QS20 or QS16 Personal Computer. Processing means further include an input device such as a keyboard or computer mouse and an output device such as a video display or printer. Preferred processing means further include one or more devices for the storage of data, such as magnetic disks or tape, processing means should also comprise an operating system or programming environment for the generation of source code in the appropriate programming language, along with a compiler or other means of converting such source code into executable programs.

Where the fluid is a near-critical or supercritical fluid, particularly carbon dioxide and mixtures of carbon dioxide With other extraction solvents, selective solvation of solutes can occur by the selective and sequential exposure of the extraction matrix in the chamber to carefully controlled density conditions. The user may wish to correlate exposure of the extraction matrix at each density setting to the number of swept chamber volumes (SCV) encountered during the timed exposure at a given density setting and fluid flow rate ($F_{con}$).

In preferred embodiments, the fluid which has passed through a chamber containing an extraction matrix is collected and characterized. Any solute dissolved therein is isolated by various well-known techniques, such as distillation, fractionation, precipitation, and crystallization. Where the fluid comprises supercritical and near-critical carbon dioxide, it is preferred that the solute be isolated by large changes in solvent density, pressure, or temperature.

Preferably, isolated solutes are further isolated by analytical chromatography and are characterized by means well known in the art as to their chemical, physical, or biological properties. For example, the chemical identity of isolated chemical solutes can often be determined by techniques such as ultraviolet, visible, fluorescence, infrared, Raman, atomic absorption, nuclear magnetic resonance, or mass spectroscopy.

Additional objects, advantages, and novel features of the present invention will become apparent to those skilled in the art upon examination of the following example thereof, which is not intended to be limiting.

In a preferred embodiment of the invention, the cylindrical chamber (120) depicted in FIGS. 1 and 2 was provided having porous end members (100). The diameter of the chamber was 10.9 mm and the distance between the its end members was 23.0 mm; thus, the chamber had an internal volume of 2.1 ml. A 0.75 g sample of wheat flour (110) was placed in the chamber. As indicated by arrows in FIG. 2, carbon dioxide was then passed through the chamber assembly at 2000 psig and 40° C. The mass flow rate in the pump was 1.0 g/min. The volumetric flow rate in the pump was 1.09 ml/min with the pump head at 4° C., and the carbon dioxide was nearly at tank pressure of 820 psig. The density in the pump head was 0.92 g/ml. The density in the chamber was 0.76 g/ml. The volumetric flow rate in the chamber was 1.32 ml/min. The fluid exiting the chamber was collected. The non-polar analytes in the fluid exiting the chamber were collected by expanding the solution into a trapping region held at 1 atm and 40° C.

A data set comprising the flow rate and respective densities of the carbon dioxide, the internal volume of the chamber, and the time elapsed since the passage of carbon dioxide has begun was periodically provided to processing means and recorded on magnetic media. Upon each such provision, the processing means applied the swept chamber volume function according to equation (3) and provided a value for swept chamber volumes. When the value for swept chamber volumes reached 5, the passage of carbon dioxide was terminated, corresponding to 7.95 minutes.

A more polar fraction of glycolipids was removed from the wheat flour in the chamber by pressure stepping from 2000 psig to 6000 psig, yielding an extract of glycolipids in the trapping region. Five chamber volumes were passed through the chamber at the higher pressure conditions. The mass flow rate from the pump was the same for both steps. The density in the 40° C., 6000 psig chamber was 0.96 g/ml. The volumetric flow rate in the chamber was 1.04 ml/min. The passage of carbon dioxide at 6000 psig was terminated at 5 chamber volumes, corresponding to 10.1 minutes.

Figure 3:
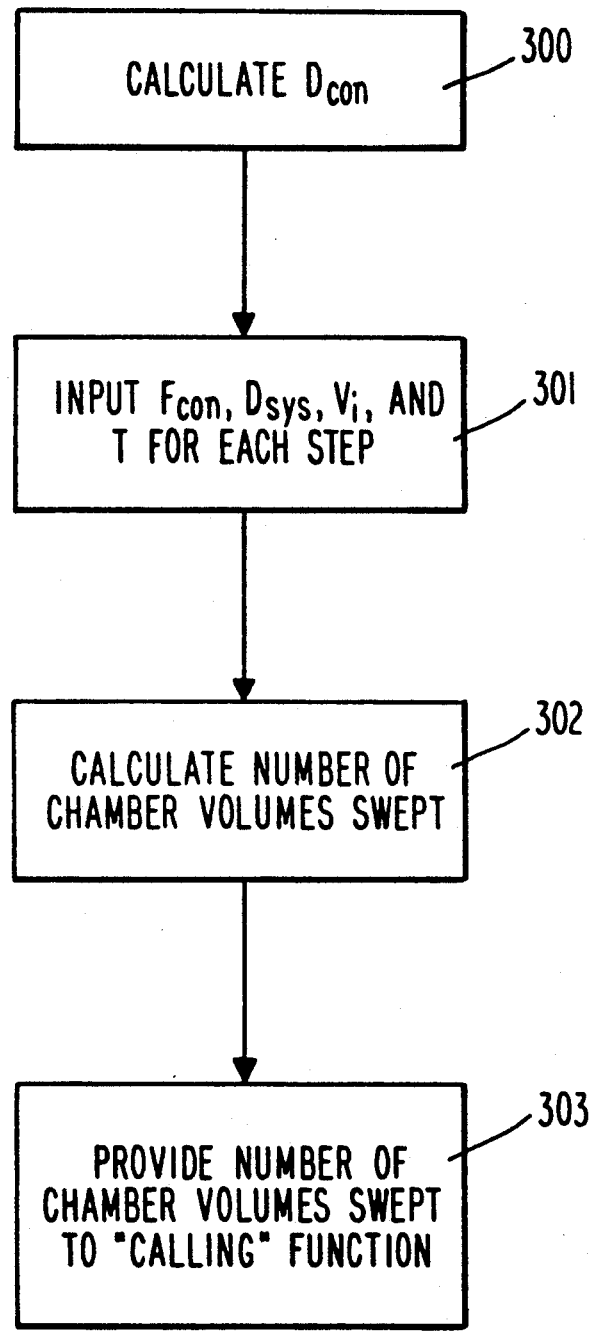
FIG. 3 is a flowchart illustrating the method of the present invention.

Turning to FIG. 3, application of the method of the present invention will be described as it relates to provision of a value for chamber volumes swept by the processing means using the CalcSweptVolumes algorithm. It should be understood that where input is to be supplied to a program or subprogram, said input can be provided in interactive mode by an operator or can be taken directly from a file containing the pertinent information.

CalcSweptVolumes is a subroutine which is incorporated into more complex computer functions to calculate the number of chamber volumes swept at user selected values for $F_{con}$, $D_{sys}$, $V_i$, and T. In CalcSweptVolumes, $D_{con}$ is first calculated at (300). Next, $F_{con}$, $D_{sys}$, $V_i$, and T for each step is input at (301). The number of chamber volumes swept is then calculated at (302) according to Equation (3). This calculated value is then provided at (303) to the function incorporating CalcSweptVolumes, the "calling" function. A function incorporating CalcSweptVolumes typically also comprises means for providing the calculated value to the user so that a decision may be made to continue or terminate the fluid flow and, hence, the extraction. The number of chamber volumes swept is preferably calculated any time one of the four user settable values are changed.

It will be appreciated that an extraction method used by processing means to control an extraction instrument consists of components called steps. A method may contain any number of steps between 1 and about 20. Each step preferably consists of an "extract" portion and a "rinse" portion. The rinse portion may contain any number of sub-steps between 0 and 21. The number of chamber volumes swept is calculated for each extract portion of each step. For each step, the user enters values for setpoints for $F_{con}$ (ml/min), $D_{sys}$ (g/ml) at the user selected chamber temperature (° C.), and T (min). The user may also change the chamber volume (ml) on each step, but this has the effect of changing the chamber volume for the whole method since only a single extraction chamber is present for one executed method.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A method for regulating the passage of a fluid through a chamber that includes a matrix from which solute can be extracted, comprising the steps of:
    passing the fluid through the chamber;
    providing a data set to processing means, said data set comprising parameter information;
    providing a swept chamber volume value by applying, via the processing means, a swept chamber volume function to the data set; and
    terminating the passage of the fluid through the chamber by reference to the swept chamber volume value.

2. The method of claim 1 wherein the fluid is passed through the chamber under supercritical conditions.

3. The method of claim 1 wherein the fluid is passed through the chamber under near-critical conditions.

4. The method of claim 1 wherein the fluid comprises carbon dioxide.

5. The method of claim 1 further comprising determining parameter information.

6. The method of claim 1 further comprising collecting fluid passed through the chamber.

7. The method of claim 1 further comprising characterizing fluid passed through the chamber.

8. The method of claim 1 wherein parameter information comprises:
    the internal volume of the chamber; and
    the volume of the fluid passed through the chamber.

9. The method of claim, 8 wherein the swept chamber volume function is applied according to $$SCV = V_f/V_i$$

wherein SCV is swept chamber volumes, $V_f$ is the volume of the fluid passed through the chamber, and $V_i$ is internal volume of the chamber.

10. The method of claim 1 wherein parameter information comprises:
    the flow rate of the fluid;
    the density ratio of the fluid;
    the internal volume value of the chamber; and
    the time interval over which the fluid is passed through the chamber.

11. The method of claim 10 wherein the swept chamber volume function is applied according to $$SCV = \{T \cdot [F_{con} \cdot (D_{con}/D_{sys})]\}/V_i$$

wherein SCV is swept chamber volumes, T is the time interval over which the fluid is passed, $F_{con}$ is fluid's flow rate in the constant pumping region, $V_i$ internal volume of the chamber, and $D_{con}/D_{sys}$ is the fluid's density ratio.

12. The method of claim 10 wherein the internal volume is the chamber's void volume.

13. The method of claim 12 wherein the chamber's void volume is estimated by reference to the volume occupied by the matrix.

14. A method for regulating the passage of a fluid having known flow rate and density ratio through a chamber that has known internal volume and that includes a matrix from which solute can be extracted, comprising the steps of:
    passing the fluid through the chamber;
    providing to processing means a data set comprising said flow rate, density ratio, and internal volume;
    providing a swept chamber volume value by applying, via the processing means, a swept chamber volume function to the data set; and
    terminating the passage of the fluid through the chamber by reference to the swept chamber volume value.

15. A method for regulating the passage of a fluid having known flow rate through a chamber that includes a matrix from which solute can be extracted and that has known void volume, comprising the steps of:
    passing the fluid through the chamber;
    providing to processing means a data set comprising said flow rate and void volume;
    providing a swept chamber volume value by applying, via the processing means, a swept chamber volume function to the data set; and
    terminating the passage of the fluid through the chamber by reference to the swept chamber volume value.

16. A method for regulating the passage of a supercritical fluid through a chamber that includes a matrix from which solute can be extracted, comprising the steps of:
    passing the fluid through the chamber;
    providing to processing means a data set comprising parameter information;
    providing a swept chamber volume value by applying, via the processing means, a swept chamber volume function to the data set; and
    terminating the passage of the fluid through the chamber by reference to the swept chamber volume value.

17. A method for regulating the passage of a near-critical fluid through a chamber that includes a matrix from which solute can be extracted, comprising the steps of:

passing the fluid through the chamber;

providing to processing means a data set comprising parameter information;

providing a swept chamber volume value by applying, via the processing means, a swept chamber volume function to the data set; and terminating the passage of the fluid through the chamber by reference to the swept chamber volume value.

18. An apparatus for regulating the passage of a supercritical fluid which comprises:

a cylindrical chamber that includes a matrix from which solute can be extracted;

means for passing the fluid through the chamber;

means for providing a swept chamber volume value by applying a swept chamber volume function to a data set comprising parameter information; and means for terminating the passage of the fluid through the chamber by reference to the swept chamber volume value.

19. The apparatus of claim 18 further comprising means for collecting fluid passed through the chamber.

20. The apparatus of claim 18 further comprising means for characterizing fluid passed through the chamber.

21. A method for regulating the passage of fluid through a chamber of known internal volume that includes a matrix from which solute can be extracted, comprising the steps of:

passing an amount of fluid through the chamber;

characterizing the amount of fluid as a multiple of the chamber internal volume; and terminating the passage of fluid when the amount of fluid reaches a selected multiple of the chamber internal volume.

* * * * *